Patented Feb. 10, 1953

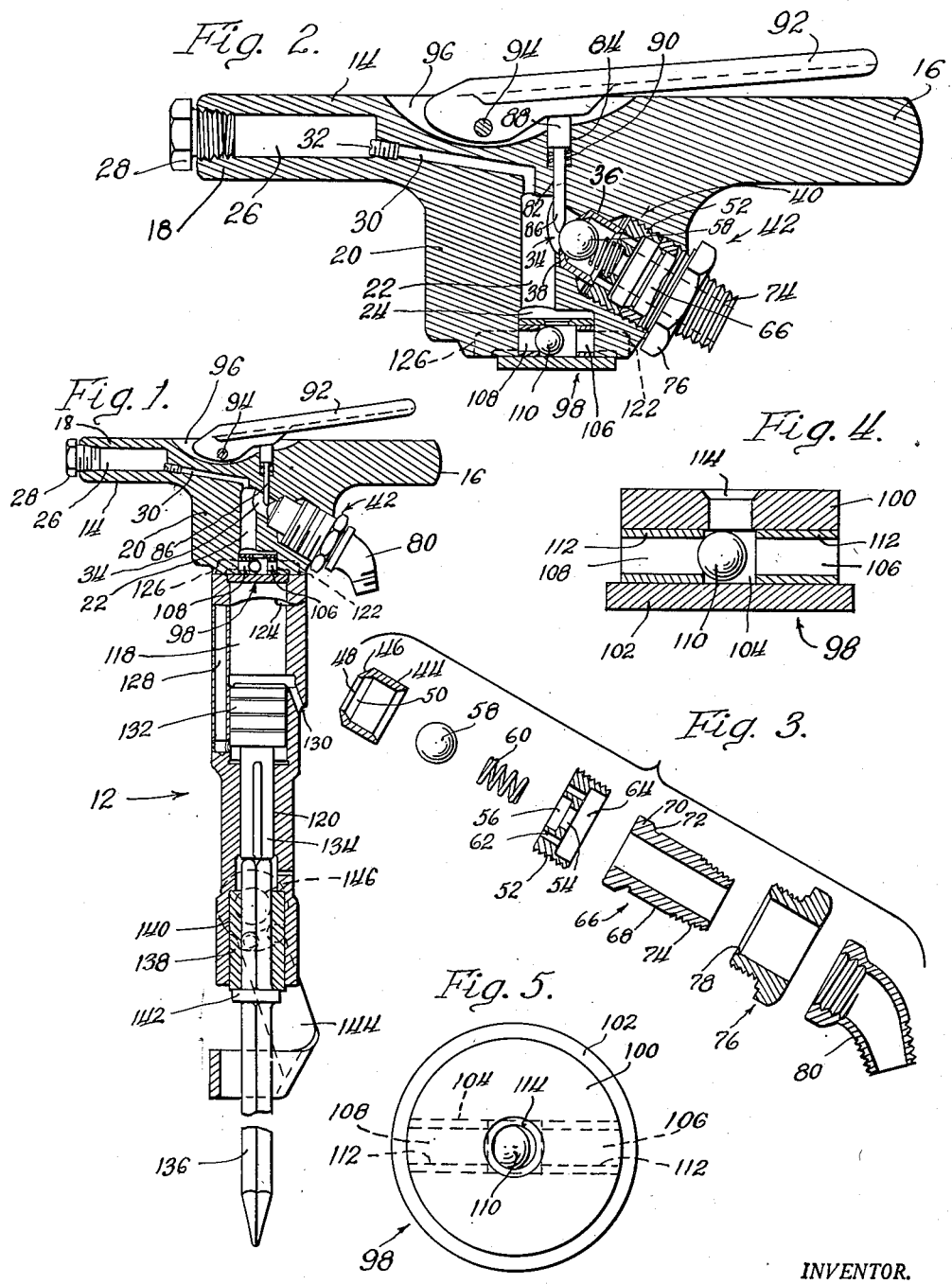

2,628,061

UNITED STATES PATENT OFFICE 2,628,061

SWIVEL TYPE AIR INLET AND THROTTLE VALVE

Horace A. Brown, Ottumwa, Iowa, assignor to Hardsocg Pneumatic Tool Company, Ottumwa, Iowa, a corporation of Iowa Application August 23, 1947, Serial No. 770,213

8 Claims. (Cl. 251—121)

This invention is directed to a combined air inlet and throttle valve. The device has particular adaptation to compressed air drills and other pneumatic tools.

An important object of the invention is the provision of an air inlet valve assembly so arranged as to permit the flow of compressed air therethrough resulting in the elimination of heretofore necessary bores drilled in the block in which the valve assembly is mounted.

It is therefore a further object of the invention to eliminate drilling operations in the valve block for pneumatic tools, which have heretofore been necessary, resulting in greater economy.

It is still another object to render necessary only a minimum of parts in the valve assembly, resulting in still further economy.

Specifically the valve assembly forming an essential part of the present invention is so designed and constructed that a spring seat is provided for a spring for closing a valve closure member, the spring seat being constructed to permit the flow of compressed air therethrough.

With these and other objects in view, my invention consists in the construction, arrangement and combination of the various parts of my device, whereby the objects contemplated are attained, as hereinafter more fully set forth, pointed out in my claims, and illustrated in the accompanying drawing, wherein:

Figure 1 is a vertical sectional view through a pneumatic tool employing the new valve assembly of my invention;

Figure 2 is an enlarged sectional view of the head portion of the pneumatic tool, the head portion forming the valve block for my new valve assembly;

Figure 3 is an exploded view of the parts forming my new valve assembly, the parts being shown on an enlarged scale;

Figure 4 is a sectional view on an enlarged scale of the reversing valve employed in the pneumatic tool; and Figure 5 is a top view of the valve shown in Fig. 4.

Referring now in detail to the drawings, Figure 1 illustrates a pneumatic drill or other demolition tool 12 upon which is fixed a head 14 forming a handle means for the tool, the head 14 also forming a valve block in which my new valve assembly is mounted and operated.

The head 14 includes transversely extending handle members 16 and 18 and a depending main portion 20. The depending portion 20 is formed with a bore 22 substantially centrally thereof, disposed vertically therein and terminating at the lower end in an enlarged bore 24. The handle member 18 is drilled to form an oil reservoir 26 closed by an oil plug 28. Leading from the oil reservoir 26 is another bore 30, of reduced diameter, leading to and communicating with the upper end of the vertical bore 22. The bore 30 is closed by an oil regulating screw 32 for controlling the flow of oil from the oil reservoir 26 into the operating parts of the drill.

Communicating with the upper end of the vertical bore 22 is another bore 34 disposed at an inclined angle thereto, and opening downwardly and outwardly through the side of the main depending portion 20 of the head 14 of the tool. The inner end of the bore 34 may be of substantially the same diameter as the bore 22, and is formed outwardly of its inner end with an enlarged counterbore 36, having an inwardly tapering inner extremity 38. Outwardly of the counterbore 36 is a still further enlarged counterbore 40 having interior threads therein.

Secured in the bore 34 is the valve assembly indicated as a whole by the reference numeral 42. The valve assembly 42 is made up of a number of parts, including a cup shaped valve seat member 44 having a tapered portion 46. The member 44 is fitted in the counterbore 36, as illustrated more clearly in Figure 2, with the tapered portion 46 disposed against the tapered portion 38 of the bore. The inner end of the cup shaped member 44 is formed with a valve opening 48 and a tapered interior valve seat 50.

Disposed outwardly of the member 44 is a spring seat 52 having exterior threads and threaded into the counterbore 40 of the bore 34, into engagement with the outer edge of the cup shaped member 44. Formed centrally in the spring seat 52 is an opening 54 terminating in an enlarged opening 56 on the inner side of the spring seat.

A ball 58 is disposed in the cup shaped member 36 and is adapted to seat against the valve seat 50 and close the valve opening 48. A compression spring 60 is disposed between the ball 58 and the spring seat 52, the outer end of the spring seating in the enlarged opening 56 of the spring seat 52.

Surrounding the opening 54 of the spring seat are a plurality of axial openings 62 for permitting the flow of air therethrough, and also providing a means for threading the spring seat 52 into and out of the bore. Formed on the outer side of the spring seat is an enlarged cavity 64.

A sleeve 66 is next inserted into the bore. The sleeve 66 has a central cylindrical portion 68 and an enlargement 70 on the inner end thereof, the enlargement 70 having a tapered surface 72 on the outer end thereof, or in a direction facing generally outwardly of the bore. The outer end of the sleeve 56 is threaded as indicated at 74.

A ferrule 76 is next inserted in the bore. The ferrule 76 is in the form of a nut, and is adapted to slide freely over the outer end of the sleeve 66. The ferrule 76 is exteriorly threaded for threading in the counterbore 40, and the inner end of the ferrule is provided with an interior tapered surface 78 adapted to engage the tapered portion 72 of the sleeve 66.

It will be noted that the axial dimension of the enlargement 70 is less than the axial dimension or depth of the cavity 64 in the spring seat 52. It will also be noted that when the ferrule 76 is inserted in the bore, the outer threaded portion 74 of the sleeve 66 extends outwardly beyond the ferrule 76. The sleeve 66 is permitted free rotation in the ferrule 76.

An elbow 80 may be threaded on the threaded portion 74 of the sleeve 66 for connection with a supply of compressed air.

Formed in the upper portion of the head 14 of the tool is another vertical bore 82 having communication with the inner end of the bore 34. The bore 82 has an enlargement 84 at its outer end. A pin 86 is slidably mounted in the bore 82, and on the outer end of the pin 86 is an enlarged head 88 fitted in the enlargement 84. A compression spring 90 is biased between the head 88 and the shoulder between the bore 82 and the enlargement 84.

The pin 86 extends into the bore 34 and is adapted to engage the ball 58 in the valve assembly 42, and the outer end of the head 88 of the pin extends outwardly of the enlarged bore 84. A trigger handle 92 is pivoted on a pin 94 mounted in the side walls of a cavity 96 formed in the top surface of the head 14 of the tool.

By depressing the trigger handle 92, the pin 86 is depressed, which in turn forces the ball 58 off of the valve seat 50 and opens the valve opening 48.

Positioned in the counterbore 24 in the lower surface of the head 14 is a reversing valve indicated generally at 98. This reversing valve forms the subject matter of my previous application, Serial No. 681,039, filed July 2, 1946, and now abandoned. By reference to Figures 4 and 5 an immediate understanding of the valve may be had.

The valve 98 comprises a cylindrical upper portion 100 fitting snugly in the counterbore 24, and a lateral flange 102 formed on the bottom thereof. A bore 104 is drilled transversely through the upper cylindrical portion 100 forming outlet passages 106 and 108. A ball 110 of slightly less diameter than the bore 104 is positioned centrally thereof and retained in place therein by sleeves 112 fitted into the bore 104 on either side of the ball 110. The inner ends of the sleeves 112 are spaced apart a distance slightly greater than the diameter of the ball, and the interior diameter of the sleeves 112 is slightly less than the diameter of the ball 110. The ball 110 is adapted to seal alternately the inner ends of the sleeves 112 and close the corresponding outlet passages 106 and 108. An axial bore 114 is drilled in the upper portion 100 and communicates with the bore 104. The bore 114 is of slightly less diameter than the ball 110. The bore 114 also communicates with the vertical bore 22 in the head 14 of the tool.

The pneumatic drill proper 12 consists of a cylinder 116 having an upper enlarged air chamber 118 and an opening 120 in the lower part thereof of less diameter than the air chamber 118.

The passage 106 communicates with a passage 122 formed in the tool head 14, which in turn communicates with an opening 124 in the air chamber 118 adjacent the top thereof.

The opposite passage 108 in the valve 98 communicates with another passage 126 formed in the tool head 14, which in turn connects with a passage 128 formed in the wall of the cylinder 116. The passage 128 communicates with the air chamber 118 adjacent the bottom thereof.

The passages 122 and 126 may not be located in the drill head 14 as illustrated, but since the tool as a whole does not form a part of the present invention, further detailed illustration is not deemed necessary.

Formed substantially midway of the air chamber 118 is an outlet port 130 opening to the exterior.

A piston 132 is slidably mounted in the air chamber 118 and is of an axial dimension less than the distance between the outlet port 130 and either end of the air chamber 118. A reduced extension 134 is formed on the lower end of the piston 132 and is slidable in the opening 120.

A drill bit 136 is slidably mounted in a bushing 138 supported in an enlargement 140 in the lower end of the opening 120. The drill bit 136 is formed with a collar or ring 142 which is engaged by a spring retainer 144 to retain the drill bit in the tool. The spring retainer 144 may be secured as at 146 to the body of the cylinder 116 in any convenient manner.

Operation of the tool as a whole

For convenience in understanding the operation of the invention, the operation of the pneumatic tool as a whole will be given briefly although the tool itself does not form a part of the present invention.

Assuming that the valve in the valve assembly 42 is open, and the ball 110 in the valve 98 is at the left, as shown in Figure 1, and the piston 132 is at the lowermost point of the air chamber 118: compressed air has just passed through the valve 98, out of passages 106, 122 and 124 and into the upper portion of the air chamber 118 and has forced the piston downwardly; when the piston has moved downwardly past the outlet port 130, the air above the piston has been exhausted and reduced in pressure; at the same time, the air below the piston has been compressed, and the pressure below the piston reacts through the passages 128, 126 and 108 and forces the ball 110 to the right and seals the passage 106; compressed air then flowing through the passage 22 passes through the valve 98, through the passages 108, 126 and 128 and into the air chamber 118 below the piston 132; this air then raises the piston; after the piston is raised to the upper part of the air chamber 118 and passes the exhaust port 130, the air below the piston is exhausted; at the same time the air above the piston is compressed, and this pressure is exerted through the passages 124, 122 and 106, and forces the ball 110 to the left and closes the passage 108.

The cycle is thus completed and continues as above described.

Operation of my new valve assembly

When the valve assembly 42 is mounted in the bore and counterbores 34, 38, and 40, a portion of the valve ball 58 extends out of the valve opening 48 into the inner end of the bore 34 where the pin 86 is adapted to engage the ball and force it back off of the valve seat 52. As explained above, this action is accomplished by depressing the trigger handle 92. Compressed air flows from a convenient source (not shown) through the sleeve 66 and through the openings 54 and 62 in the valve seat 52. The ferrule 76 is turned into the counterbore 40 into tight engagement with the outer surface of the valve seat 52. In such relationship the sleeve 66 is permitted a slight degree of axial movement, that is, between the tapered portion 78 in the ferrule 76 and the inner extremity of the cavity 64 in the valve seat 52. The compressed air in the inner end of the bore 34 reacts against the inner annular surface of the sleeve 66 and forces it outwardly. This outward movement of the sleeve 66 brings the tapered surface 72 on the sleeve into tight engagement with the tapered surface 78 on the ferrule 76, and prevents the escape of air therebetween outwardly of the bore.

It will be noted that the elbow 80 can be brought into tight sealing engagement with the threads 74 on the sleeve 66 due to the taper thereof. The sleeve 66 is permitted free rotation in the ferrule 76 so that the tool may be used in any position, and the hose leading from the source of compressed air and connected with the elbow 80 may assume any position and swing the sleeve 66 to accommodate any position of the hose.

It will be evident that the valve assembly 42 of my invention in itself is made up of rugged parts not readily susceptible to being damaged or in need of repair. Such simple construction of the valve assembly results in great economy.

A further simplicity in construction resulting in economy, results from the special construction of the spring seat 52. The spring seat 52 forms a seat for the compression spring 60 and at the same time permits the flow of air therethrough.

It was heretofore necessary in utilizing a valve assembly to form a separate bore or passage disposed behind the valve seat for the flow of air therethrough. In the present construction such additional bore or passage is unnecessary, which results in a further economy. It will be noted that the air passages in the valve block or head 14 comprise only a single passage or two drilled segments, one for mounting the valve assembly therein and the other for direct communication with the drill tool.

While I have herein shown and described a preferred embodiment of my invention, manifestly it is susceptible of modification and rearrangement of the parts without departing from the spirit and scope thereof. I do not, therefore, wish to be understood as limiting my invention to the precise form herein disclosed, except as I may be so limited by the appended claims.

I claim as my invention:

1. A valve assembly for mounting and operation in a threaded bore in a valve block, said bore in its entirety forming an air passage, said assembly comprising, in combination, a valve seat member, a spring seat threaded in said bore for retaining said valve seat member therein, a closure member and spring between said valve seat and spring seat, said spring biasing said closure member to valve closing position, said spring seat having a passage for flow of air therethrough, a sleeve in said bore outwardly of said spring seat, said sleeve having an enlargement on its inner end adjacent said spring seat, said sleeve being freely rotatable in said bore, a ferrule surrounding said sleeve threaded in said bore, said ferrule bearing against said enlargement for retaining said sleeve in said bore, said enlargement on the sleeve being adapted to be biased against said ferrule, whereby a seal between said enlargement and said ferrule is obtained, said sleeve having a threaded portion extending outwardly beyond said ferrule adapted for connection with a source of compressed air.

2. A valve assembly for mounting and operation in a bore of a valve block, said bore in its entirety forming an air passage, said bore having an inner portion and an outer threaded portion, said assembly comprising, in combination, a cup shaped member in said inner portion of the bore, said cup shaped member having a valve opening and valve seat, a spring seat threaded in said outer threaded portion of the bore for retaining said cup shaped member in the bore, a ball in said cup shaped member adapted to close said valve seat, a compression spring between said ball and spring seat biasing said ball to valve closing position, said spring seat having a passage for flow of air therethrough, the outer side of said spring seat having a cavity formed therein, a sleeve in said bore outwardly of said spring seat, said sleeve having an enlargement on its inner end fitting in said cavity in said spring seat, said enlargement having a tapered surface directed generally outwardly of the bore, and a ferrule surrounding said sleeve threaded in the bore, the inner end of said ferrule bearing against said spring seat and having a tapered surface conforming to and adapted to engage said tapered surface on said enlargement of said sleeve, said enlargement having limited axial movement between said spring seat and ferrule and said sleeve thereby having limited axial movement, said sleeve having a threaded portion extending outwardly beyond said ferrule.

3. A valve assembly for mounting and operation in a threaded bore in a valve block, said bore in its entirety forming an air passage, said assembly comprising, in combination, a member positioned in said valve block bore and having a bore therethrough and a valve seat, valve closure means for the valve seat, means for retaining said member and closure means in position in the bore, said retaining means having a passage for flow of air therethrough, a sleeve in the outer portion of the bore having communication with said valve seat, securing means for retaining said sleeve in the bore, said sleeve being freely rotatable in said securing means, said sleeve being adapted to be biased against said securing means, and said sleeve and securing means having interengaging sealing surfaces to substantially prevent the escape of air therebetween outwardly of the bore.

4. A valve assembly for mounting and operation in a bore of a valve block, said bore forming an air passage with its inner end communicating with a work piece and its outer end communicating with the exterior of the block, said bore being adapted for the inflow of air through its outer end and entirely through the bore to the other end, said assembly including an element freely rotatable in said bore and having limited axial movement within said bore, said element having a portion extending out of said outer end, said portion being adapted for connection with a source of compressed air, means securing said element in said bore, said element being adapted to be biased against the means securing said element in said bore, and said element and said means having interengaging sealing surfaces adapted to seal against the flow of air therebetween from said bore through said outer end.

5. A valve assembly for pressurized fluids, which valve assembly is adapted for mounting and operation in a bore of a valve block, said valve assembly comprising an outlet member having a passageway therethrough and a valve seat formed therein, a closure member adapted to cooperate with said valve seat to close said passageway, a spring seat having a central passageway therethrough, a compression spring between said closure member and said spring seat biasing said closure member against said valve seat, means for maintaining said outlet member and said spring seat in position with respect to each other, a sleeve inlet member, a ferrule surrounding said sleeve inlet member and being maintained in position with respect to said spring seat, and means permitting limited axial movement of the sleeve inlet member, said sleeve inlet member being adapted to be biased against said ferrule, whereby a seal against the flow of fluid between said inlet member and said ferrule is obtained.

6. A valve assembly for pressurized fluids, which valve assembly is adapted for mounting and operation in a bore of a valve block, said valve assembly comprising an outlet member having a passageway therethrough and a valve seat formed therein, a closure member adapted to cooperate with said valve seat to close said passageway, a spring seat having a central passageway therethrough, a compression spring between said closure member and said spring seat biasing said closure member against said valve seat, means for maintaining said outlet member and said spring seat in position with respect to each other, a sleeve inlet member having a flange extending outwardly therefrom, a ferrule surrounding said sleeve inlet member and being maintained in position with respect to said spring seat, said inlet member flange being positioned between the spring seat and the ferrule, whereby limited axial movement of the sleeve is afforded, said spring seat having a plurality of auxiliary passageways therein, which passageways open at one end to the pressurized fluid and open at the other end opposite the inlet member flange, so that the sleeve inlet member and flange thereon are axially biased under fluid pressure towards the ferrule, said inlet member flange and ferrule having interengaging sealing surfaces to substantially prevent the escape of fluid therebetween.

7. A valve assembly for pressurized fluids, which valve assembly is adapted for mounting and operation in a bore of a valve block, said valve assembly comprising an outlet member having a passageway therethrough and a valve seat formed therein, a closure member adapted to cooperate with said valve seat to close said passageway, a spring seat having a central passageway therethrough, a compression spring between said closure member and said spring seat biasing said closure member against said valve seat, means for maintaining said outlet member and said spring seat in position with respect to each other, a sleeve inlet member having a flange extending outwardly therefrom, a ferrule surrounding said sleeve inlet member and being maintained in position with respect to said spring seat, said inlet member flange being positioned between the spring seat and the ferrule, whereby limited axial movement of the sleeve is afforded, said spring seat having a plurality of auxiliary passageways therein, which passageways open at one end to the pressurized fluid and open at the other end opposite the inlet member flange, so that the sleeve inlet member and flange thereon are axially biased under fluid pressure towards the ferrule, said inlet member flange having a tapered surface thereon, and said ferrule having a tapered surface conforming to and adapted to engage said tapered surface on said inlet member flange, whereby a fluid seal between said inlet member flange and said ferrule is obtained.

8. A valve assembly for pressurized fluids, which valve assembly is adapted for mounting and operation in a bore of a valve block, said valve assembly comprising an outlet member having a passageway therethrough and a valve seat formed therein, a closure member adapted to cooperate with said valve seat to close said passageway, a spring seat having a central passageway therethrough, a compression spring between said closure member and said spring seat biasing said closure member against said valve seat, means for maintaining said outlet member and said spring seat in position with respect to each other, a sleeve inlet member having a flange extending outwardly therefrom, a ferrule surrounding said sleeve inlet member and being maintained in position with respect to said spring seat, said inlet member flange being positioned between the spring seat and the ferrule, whereby limited axial movement of the sleeve is afforded, said sleeve inlet member and the flange thereon axially towards the ferrule, said inlet member flange having a tapered surface thereon being adapted to be biased, and said ferrule having a tapered surface conforming to and adapted to engage said tapered surface on said inlet member flange, whereby a fluid seal between said inlet member flange and said ferrule is obtained.

HORACE A. BROWN.

REFERENCES CITED

The following references are of record in the file of this patent:

UNITED STATES PATENTS

| Number | Name | Date |
|---|---|---|
| 96,545 | Brady | Nov. 9, 1869 |
| 272,040 | Graham | Feb. 13, 1883 |
| 710,674 | Fassman | Oct. 7, 1902 |
| 1,026,564 | Crawford | May 14, 1912 |
| 1,047,863 | Wall | Dec. 17, 1912 |
| 1,953,242 | Leeb | Apr. 3, 1934 |
| 2,008,657 | Deiller | July 16, 1935 |
| 2,038,508 | Elliot | Apr. 21, 1936 |
| 2,362,608 | Allen | Nov. 14, 1944 |
| 2,388,026 | Ward | Oct. 30, 1945 |